United States Patent
Tamura et al.

(10) Patent No.: US 8,504,792 B2
(45) Date of Patent: Aug. 6, 2013

(54) METHODS AND APPARATUSES TO ALLOCATE FILE STORAGE VIA TREE REPRESENTATIONS OF A BITMAP

(75) Inventors: Eric Brandon Tamura, Sunnyvale, CA (US); David Alexander Majnemer, Great Neck, NY (US)

(73) Assignee: Apple Inc., Cupertino, CA (US)

( * ) Notice: Subject to any disclaimer, the term of this patent is extended or adjusted under 35 U.S.C. 154(b) by 453 days.

(21) Appl. No.: 12/645,364

(22) Filed: Dec. 22, 2009

(65) Prior Publication Data

US 2011/0153976 A1 Jun. 23, 2011

(51) Int. Cl.
*G06F 12/00* (2006.01)
*G06F 13/00* (2006.01)
*G06F 13/28* (2006.01)
*G06F 7/00* (2006.01)
*G06F 17/30* (2006.01)

(52) U.S. Cl.
USPC .......... 711/170; 711/171; 707/745; 707/791; 707/797

(58) Field of Classification Search
USPC .................. 711/170, 171; 707/745, 791, 797
See application file for complete search history.

(56) References Cited

U.S. PATENT DOCUMENTS

| | | | |
|---|---|---|---|
| 5,375,233 A | 12/1994 | Kimber et al. | |
| 6,182,121 B1 * | 1/2001 | Wlaschin | 709/215 |
| 2005/0050108 A1 | 3/2005 | Sawant et al. | |
| 2008/0183777 A1 | 7/2008 | Xi et al. | |
| 2008/0183958 A1 | 7/2008 | Cheriton | |
| 2009/0034377 A1 | 2/2009 | English et al. | |
| 2009/0271589 A1 | 10/2009 | Karpoff et al. | |

OTHER PUBLICATIONS

"Binmaps: hybridizing bitmaps and binary trees", Victor Grishchenko and Johan Pouwelse, Apr. 2009, http://www.pds.ewi.tudelft.nl/fileadmin/pds/reports/2011/PDS-2011-005.pdf.*
Scalability in the XFS File System "Scalability in the XFS File Systems" Adam Sweeney, Doug Doucette, Wei Hu, Curtis Anderson, Mike Nishimoto, and Geoff Peck; Silicon Graphics, Inc. Jan. 1996 USENEX, http://oss.sgi.com/projects/xfs/papers/xfs_usenix/index.html.*
"Scalability and Performance in Modern File Systems", Philip Trautman and Jim Mostek, http://linux-xfs.sgi.com/projects/xfs/papers/xfs_white/xfs_white_paper.html Earliest internet appears was Apr. 24, 2001 using the internet Archive wayback machine at http://archive.org/web/web.php.*

(Continued)

*Primary Examiner* — Michael Alsip
(74) *Attorney, Agent, or Firm* — Womble Carlyle Sandridge & Rice LLP

(57) ABSTRACT

Methods and apparatuses that search tree representations of a bitmap for available blocks to allocate in storage devices are described. An allocation request for a file may be received to initiate the search. In one embodiment, the bitmap may include an array of bits corresponding to blocks in the storage devices. Each bit may indicate whether one of the blocks is available. The tree representations may include at least one red-black tree having nodes corresponding to one or more consecutive bits in the bitmap indicating an extent of available blocks. One of the tree representations may be selected according to a file associated with an allocation request to identify an extent of available block matching the allocation request. The tree representations may be synchronized as the bitmap is updated with changes of block allocations in the storage devices.

17 Claims, 5 Drawing Sheets

OTHER PUBLICATIONS

"An Extensive Examination of Data Structures Using C# 2.0", Jan. 2005, Scott Mitchell, msdn. http://msdn.microsoft.com/en-US/library/ms379572(v=vs.80).aspx.*

International Search Report and Written Opinion mailed Feb. 18, 2011, for International Application No. PCT/US2010/059298, filed Dec. 7, 2010, 14 pages.

* cited by examiner

200

Bitmap 201

| 1 | 1 | 0 | 0 | 0 | 0 |
| 0 | 1 | 1 | 1 | 0 | 0 |
| 1 | 0 | 0 | 0 | 1 | 1 |

207 points to the top-left "1"; 213 points to the second row;

Location Tree 203

Extent Tree 205

209 points to node "3"; 211 points to node "5"

METHODS AND APPARATUSES TO ALLOCATE FILE STORAGE VIA TREE REPRESENTATIONS OF A BITMAP

FIELD OF INVENTION

The present invention relates generally to file systems. More particularly, this invention relates to allocating blocks in storage devices for files based on a bitmap.

BACKGROUND

One major requirement for a file system is to keep track of available free space of storage devices in units of blocks. Traditionally, file systems may use a bitmap to represent free space. A bitmap is simply an array of bits, with the Nth bit indicating whether the Nth block is allocated or free. Thus, the overhead of a bitmap may be relatively low, such as, about 0.003% for one bit per 4K size block. For a 1 GB file system, the corresponding bitmap is about 32 KB in size, which may easily fit in memory for quick scanning to identify free space.

However, as sizes of file systems continue to grow faster than the growth of memory sizes, loading a bitmap used in a file system to scan may become non-trivial in either size or time. For example, a 32 GB size bitmap for a 1 PB file system may not fit in memory on most data processing systems or machines. As a result, scanning a bitmap may require reading the bitmap from disk each time (e.g. paged in and out of a disk), which can significantly slow down a file system.

Furthermore, loading a large size bitmap into memory may directly compete with other kernel tasks for finite resources available in a data processing system. For example, if the bitmap cannot be completely cached, a number of buffers may be needed to manage paging operations. Because each buffer may require allocation of one of a finite number of buffer headers in a system, loading a large size bitmap can further degrade system performance.

Thus, traditional file systems that use a bitmap to allocate free space in storage devices do not scale with the growth of modern file systems.

SUMMARY OF THE DESCRIPTION

An embodiment of the present invention can include methods and apparatuses that search tree representations of a bitmap (such as a red-black tree) for available blocks to allocate in storage devices. An allocation request for a file may be received to initiate the search. In one embodiment, the bitmap may include an array of bits corresponding to blocks in the storage devices. Each bit may indicate whether one of the blocks is available. The tree representations may include at least one red-black tree having nodes corresponding to one or more consecutive bits in the bitmap indicating an extent (e.g. including offset and length) of available blocks. One of the tree representations may be selected based on the nature of the allocation request for a given file (e.g. allocation size request, whether the file exists or not etc.). The tree representations may be synchronized with the bitmap as it is updated with changes of block allocations in the storage devices.

In an alternative embodiment, a location tree and an extent tree may be maintained in memory (e.g. RAM) to represent a bitmap in storage devices (e.g. a hard drive) indicating allocation status for blocks in the storage devices. The location tree may be a red-black tree keyed according to locations of extents of available blocks. The extent tree may be a red-black tree keyed according to sizes of extents of available blocks. One or more nodes from the location tree and/or the extent tree may be identified based on searching the specified tree for extents of unallocated space that matches criteria based upon an allocation request for a file. The bitmap may be traversed if the location tree and/or the extent tree do not include matching nodes for search criteria. The location tree and the extent tree may be built up by traversing the bitmap and inserting nodes that represent unallocated regions of disk space.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
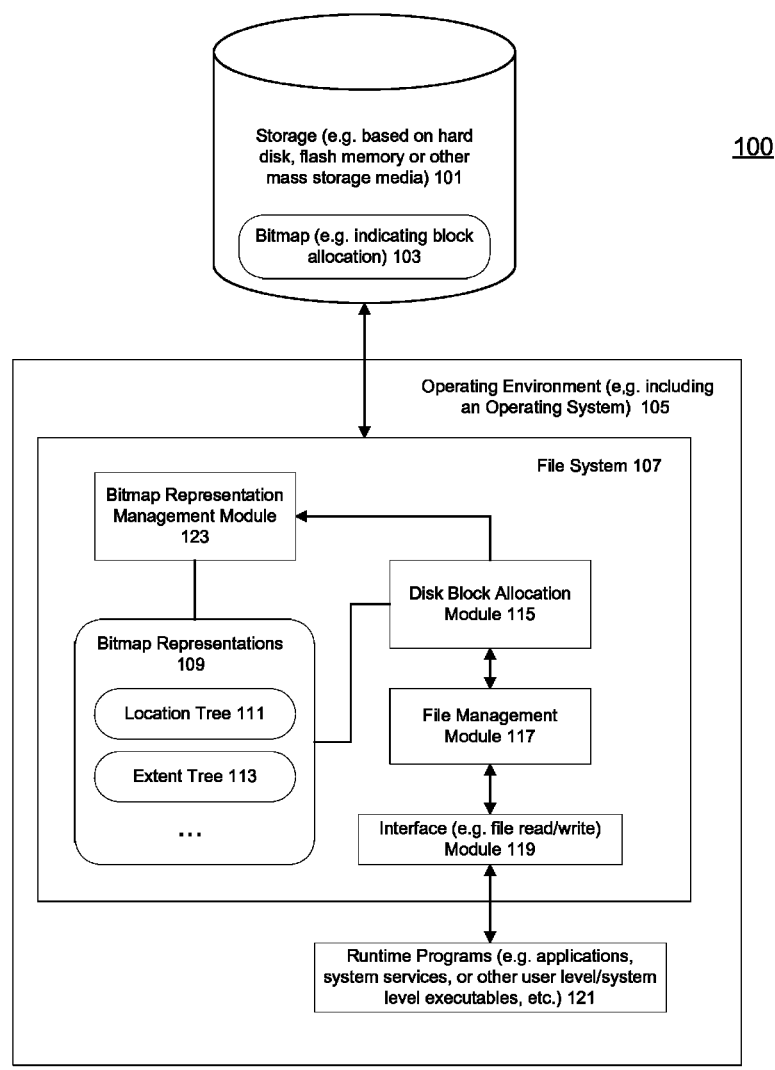
FIG. 1 is a block diagram illustrating one embodiment of a system to search tree representations of a bitmap to allocate blocks.

Methods and apparatuses for allocating blocks based on tree representations of a bitmap are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, at least two red-black trees in memory (e.g. main memory such as DRAM) are used to represent a bitmap in disk (or other mass storage devices, such as flash memory, hard drives, etc.) mapping block allocation status in a file system. High level structures among bits in a bitmap may be explicitly described in tree representations (or tree structures) of the bitmap. For example, a section of 200 unused blocks starting at the $10^{th}$ block in a bitmap may be readily identified in a tree node including an offset parameter of 10 and a size parameter of 200. Consequently, a perfect match for allocating 200 blocks, e.g. for a giant movie file, can be found within a bounded time frame based on an efficient red-black tree search.

In one embodiment, separate red-black trees representing a bitmap may enable searching for optimal allocation using different search criteria. For example, to locate a section of contiguous blocks to append to a file, a location based tree representation of the bitmap may be searched to find unallocated blocks nearest to a specified location. Alternatively, to locate a chunk of space for a new file, a size based tree representation of the bitmap may be searched to find a contiguous range of blocks for the chunk of space.

In the event a search cannot identify a perfect match, in one embodiment, a second search using different search criteria may be performed on the same tree or a different tree. For example, if searching a location based tree for a chunk of space fails to yield a match, subsequent searches may be performed to identify one or many sections of blocks based on a requested size, e.g. a minimum number of blocks having a capacity to accommodate the requested size.

In one embodiment, another search may be performed according to a search criteria based on a nearby location relative to an existing location of allocated blocks for a file within a configured threshold (e.g. 4 blocks). The search criteria may include the minimum number of blocks to identify extents of available blocks located close to the file and large enough for the requested size. Multiple search results may be combined together for optimal block allocation that minimizes disk fragmentation.

In some embodiments, one or more red-black trees maintained in memory to represent a bitmap kept in disk may be built on demand according to a lazy mechanism to conserve memory and/or provide faster allocation response. Thus, each tree may grow incrementally as a file system performs operations to allocate/free storage space. When a tree is fully populated, the tree may represent a bitmap in disk completely.

In one embodiment, the red-black trees may be built during system boot time without incurring additional cost, so that a bitmap representation may be loaded in memory when system starts. Typically, tree representations of a bitmap may be kept in memory without being stored in a disk. Updating tree representation of a bitmap may be performed in a file system prior or subsequent to changes of the bitmap in disk.

FIG. 1 is a block diagram illustrating one embodiment of a system to search tree representations of a bitmap to allocate blocks. In one embodiment, system 100 may include a computer operating environment 105 having a file system 107 in an operating system. Storage 101 may be one or more storage devices, such as hard disks, flash memories or other mass storage media, locally or remotely coupled to system 101. In one embodiment, files in system 100 may be stored in one or more blocks allocated in storage 101. Storage 101 may include bitmap 103 representing availability of each allocated block using a bit (e.g. using 0/1 as status values to indicate if a block is free/allocated).

In one embodiment file system 107 may include interface module 119 to receive file access (read/write) requests from runtime programs 121, e.g. via API (application programming interface). File management module 117 may determine file access operations, such as file read, file write, file creation, file deletion, etc. for the received file access requests. For example, file management module 117 may send a storage allocation request to disk block allocation module 115 for creating new file and/or storing/updating data to a file.

In one embodiment, file system 107 may include bitmap representations 109 for one or more in memory representations, such as location tree 111 or extent tree 113, of bitmap 103. Each in memory representation may correspond to at least a portion of bitmap 103. For example, each node in location tree 111 and/or extent tree 113 may include location and/or size information corresponding to one or more consecutive blocks (or extents) which are available as indicated in bitmap 103.

In one embodiment, bitmap representation management module 123 can build and/or maintain bitmap representations 109 in memory in sync with bitmap 103 in storage 101. For example, bitmap representation management module 123 can access a portion of bitmap 103 loaded in memory when a search is performed directly on bitmap 103. Alternatively, bitmap representation management module 123 may receive an update notification when bitmap 103 is updated.

File system 107 may include disk block allocation module 115 to allocate blocks in storage 101 for storing file content according to bitmap representations 109 without accessing bitmap 103 in storage 101. Disk block allocation module 115 may determine which blocks are available in storage 103 and select one or more available blocks large enough to accommodate an amount of data to be stored, e.g. in response to an allocation request for a file. In one embodiment, disk block allocation module 115 may access one or more trees in bitmap representations 109 in memory and/or bitmap 103 in storage 101 to identify available blocks to allocate.

For example, disk block allocation module 115 can dynamically determine an order (e.g. starting with location tree 111 for writing data to an existing file) to search separate trees in bitmap representations 109 for identifying available blocks for allocation in response to an allocation request, according to, e.g. one or more characteristics of the request, such as whether a file associated with the request exists or not. Disk block allocation module 115 may directly search bitmap 103 when necessary, for example, if no desired blocks are found via bitmap representations 109.

In one embodiment, bitmap representation management module 123 can build bitmap representations 109 concurrent to disk block allocation module 115 accessing bitmap 103. For example, disk block allocation module 115 may load a portion of bitmap 103 in memory to update bitmap 103 for block allocation or to search for available blocks to allocate. Bit map representation management module 123 may build into bitmap representations 109 with block allocation status from a portion of bitmap 103 already loaded in memory. In one embodiment disk block allocation module 115 may determine when to access bitmap 103 for bitmap representation management module 123 to update and/or build bitmap representations 109.

Figure 2:
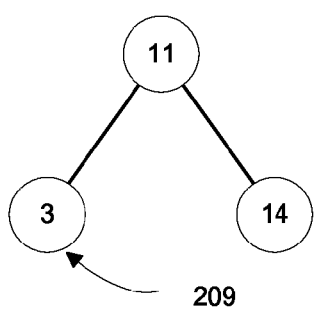
FIG. 2 is a sample diagram illustrating exemplary red-black trees for representing a bitmap.
Figure 2:
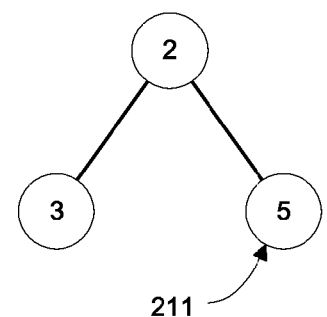

FIG. 2 is a sample diagram illustrating exemplary red-black trees for representing a bitmap. Example 200 may be based on a file system maintaining one or more trees to represent a bitmap for allocating blocks of file storage space, such as in system 100 of FIG. 1. In one embodiment, bitmap 201 may include an array of bits to indicate an allocation status for blocks in storage devices, such as bitmap 103 in storage 101 of FIG. 1. Each bit may indicate whether a corresponding block is available or not. For example, bit 207 may have value 0 for a block which has already been occupied.

In one embodiment, location tree 203 and extent tree 205 may be stored in memory, such in bitmap representations 109 of FIG. 1, to represent portions of bitmap 201. Trees 203, 205 may be based on a self-balancing binary search tree as the underlying data structure to allow efficient update operations on the trees, such as search, delete, insert etc. For example, trees 203, 205 may be red-black trees using red-black tree update operations for ensuring the trees are reasonably balanced.

Location tree 203 may be configured with nodes representing available blocks indicated in bitmap 201 based on a red-black tree structure (or tree representation) including keys for the nodes. In one embodiment, location tree 203 may be keyed according to starting locations of consecutive available blocks or available block extents. For example, node 209 may include a location key 3 corresponding to a location of a starting block, e.g. indicated by bit 207, for 5 available consecutive blocks, e.g. indicated by 5 bits between bit 207 and bit 213. Node 209 may include a size key indicating the size of the consecutive blocks.

In one embodiment, extent tree 205 can be configured with nodes representing available blocks indicated in bitmap 201 using sizes of consecutive available blocks as keys based on a red-black tree structure. For example, node 211 may include a size key 5 corresponding to 5 consecutive available blocks, e.g. indicated by 5 bits between bit 207 and bit 213. Node 211 may include a location key, e.g. 3, to denote a starting block corresponding to bit 207 (the third bit) of bitmap 201.

Figure 3:
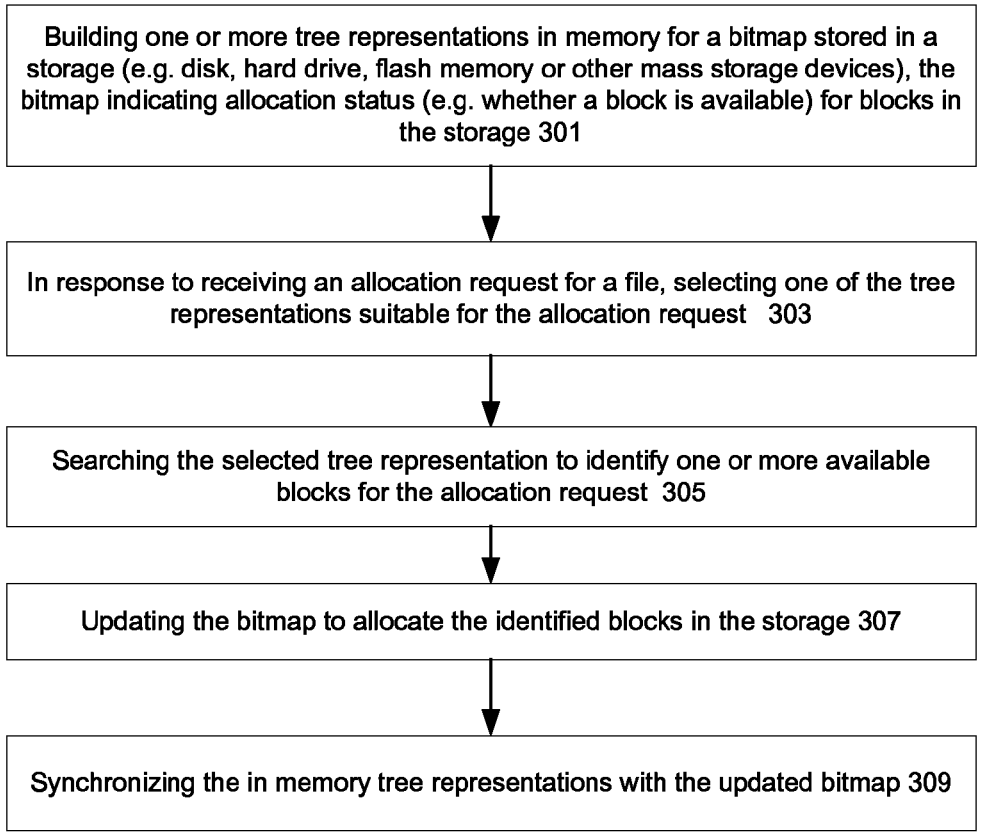
FIG. 3 is a flow diagram illustrating one embodiment of a process to identify available blocks for allocation without searching a bitmap.

FIG. 3 is a flow diagram illustrating one embodiment of a process to identify available blocks for allocation without searching a bitmap. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. At block 301, the processing logic of process 300 may build one or more tree representations in memory, such as trees 111, 113 of FIG. 1, to represent a bitmap maintaining status of block allocation in a storage system, such as bitmap 103 of FIG. 1. For example, the processing logic of process 300 may start building tree representations for a bitmap when a system, such as system 100 of FIG. 1, is booting up. A tree representation built in a system may stay in memory during the lifetime of the running system.

In one embodiment, the processing logic of process 300 may load a portion of a large bitmap (e.g. when compared with available memory resources) to build tree representations for the bitmap incrementally. In some embodiments, the processing logic of process 300 can generate tree representations for a portion of a bitmap loaded (e.g. read in from a disk storing the bitmap) when a system starts. A tree representation may correspond to (or cover) a portion of a bitmap. The processing logic of process 300 may keep track of which portion of a bitmap is covered in a tree representation.

The processing logic of process 300 may identify extents of available blocks from a bitmap. Each extent may correspond to maximal consecutive available blocks (e.g. bounded by two blocks which are not available) indicated in a bitmap (e.g. based on bits of value 0) between two allocated blocks (e.g. based on bits of value 1). An extent may include a starting location indicated in the bit map, such as an index of a bit for a starting block of the extent. Alternatively, an extent may include a size representing, for example, number of blocks included in the extent. A node in a tree representation of a bit map may correspond to an extent of available blocks.

In one embodiment, when mounting a file system (e.g. including setting up where files should appear in a directory tree), the processing logic of process 300 may retrieve tree representations for a bitmap of the file system directly from a storage device, such as storage 101 of FIG. 1, without loading (or scanning) the bitmap to rebuild the tree representations.

The tree representations for the bitmap may be maintained in memory if the corresponding file system is mounted. In one embodiment, the processing logic of process 300 may store or write out the tree representations in a storage device, e.g. when a corresponding file system is unmounted (e.g. removed from an operating system), after a complete scan of a bitmap to update the tree representations for the bitmap. The processing logic of process 300 may determine to skip a full scan of a bitmap if the bitmap represented by available tree representations stored in a storage device has not been modified. For example, the processing logic of process 300 may compare time stamps of the bitmap and tree representations stored in the storage device to determine if the tree representations still represent the bitmap.

At block 303, in one embodiment, the processing logic of process 300 may receive an allocation request for a file, such as a file write request from runtime programs 121 of FIG. 1. In response, the processing logic of process 300 may select a tree representation for a bitmap to identify available blocks most suitable for the received request. For example, the processing logic of process 300 may select a location tree, such as location tree 113 of Figure, for a request to allocate storage space for a file which has already existed in a file system. Alternatively, the processing logic of process 300 may search a location tree, such as location tree 113 of FIG. 1, to allocate storage space for a new file.

At block 305, in one embodiment, the processing logic of process 300 may search a selected tree representation of a bitmap to identify one or more available blocks to allocate for an allocation request based on one or more search criteria. In one embodiment, search criteria may include considerations to reduce fragmentation effects when allocating storage space (e.g. blocks).

For example, the processing logic of process 300 may perform a red-black tree search against a location tree to identify a node matching an allocation request specifying an allocation size and/or a starting location for an extent of available blocks. In one embodiment, a node in a location tree may be a match for a tree search if a corresponding extent of available blocks is large enough (e.g. based on a size key) to accommodate a requested allocation size and located (e.g. based on a location key) at the starting location.

Similarly, the processing logic of process 300 may perform a red-black tree search against an extent tree to identify a node matching an allocation request specifying an allocation size. For example, search criteria may include a minimum number of blocks to accommodate the requested allocation size. A node in an extent tree may be a match for the tree search if the node corresponds to an extent of the minimum number of available blocks. In some embodiments, a matching node may correspond to an extent of available blocks with a capacity large enough (e.g. based on a size key) to accommodate requested allocation size.

In another embodiment, the processing logic of process 300 may start searching a location tree in response to a request to allocate additional storage space for an existing file. The processing logic of process 300 may use search criteria to locate an extent of available blocks next to the last block allocated for the file. Alternatively, the processing logic of process 300 may start searching an extent tree to allocate storage space for creating a new file. The processing logic of process 300 may specify search criteria to identify an extent of available blocks best matching the request for the new file (e.g. by comparing the size of an extent of available blocks and the size of storage space requested).

If no matched node is identified from a tree representation during a tree search, in one embodiment, the processing logic of process 300 may proceed to search another tree representation using similar or different search criteria. Alternatively, if multiple nodes are matched during a tree search, the processing logic of process 300 may select a best one among the matched nodes to, for example, minimize fragmentation in storage space. In some embodiments, the processing logic of process 300 may directly search a portion of bitmap not yet represented by in memory tree representations, for example if matched nodes cannot be identified during the tree search. Optionally, the processing logic of process 300 may determine to allocate a plurality of blocks, which may not be consecutively located all together, for an allocation request based on extents of available blocks corresponding to multiple nodes in a tree representation of a bitmap.

At block 307, the processing logic of process 300 may update a bitmap to allocate identified blocks in a storage system (e.g. storage devices for file systems) based on results of searching in memory tree representations of the bitmap. The processing logic of process 300 may synchronize the in memory tree representations with the updated bitmap at block 309, e.g. via operations such as search, insert and/or delete performed according to red-black tree structures. In other embodiments, the processing logic of process 300 may update in memory tree representations of a bitmap to indicate allocation of identified blocks prior to update the bitmap in storage system.

Figure 4:
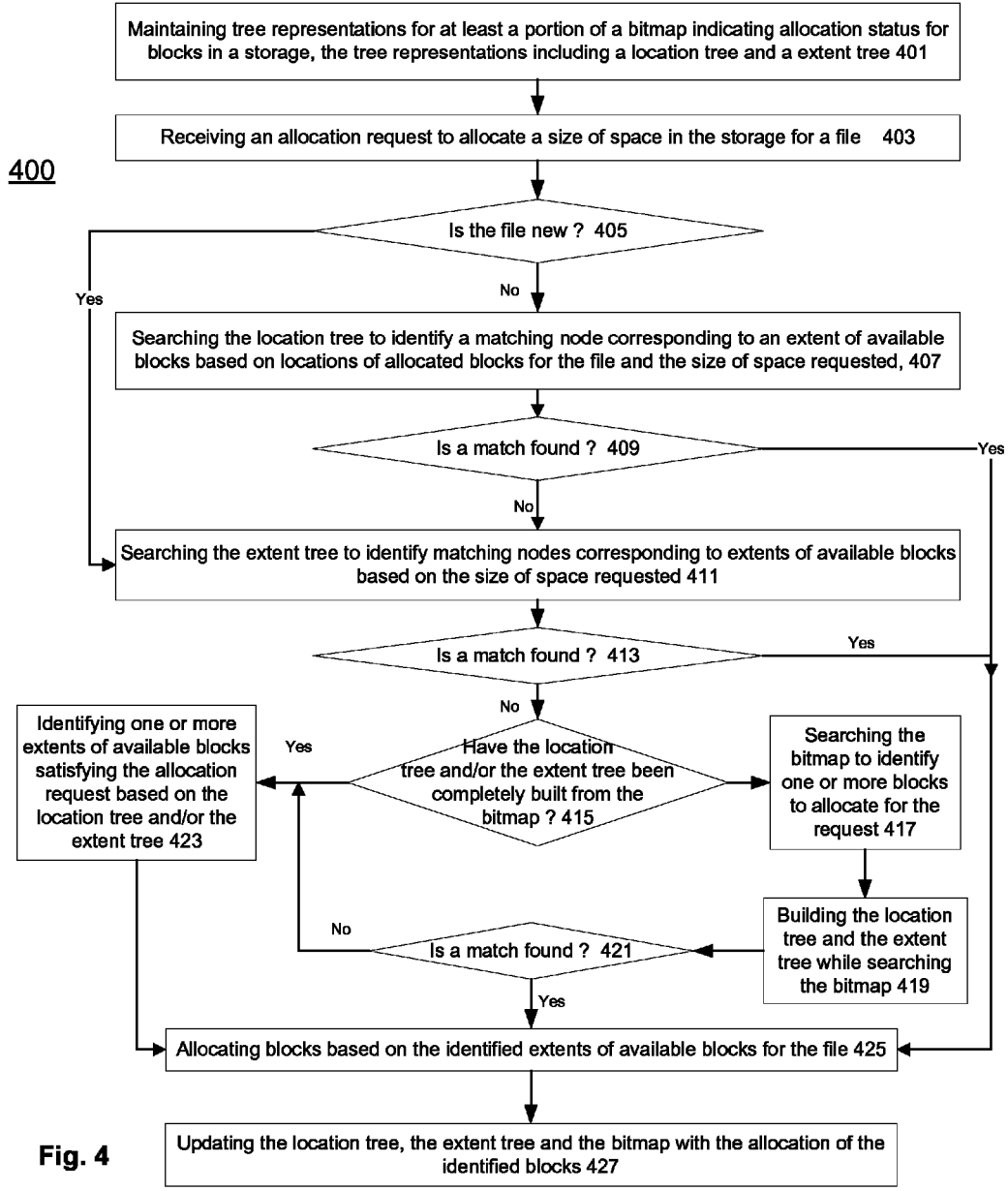
FIG. 4 is a flow diagram illustrating one embodiment of a process to search tree representations of a bitmap for block allocation.

FIG. 4 is a flow diagram illustrating one embodiment of a process to search tree representations of a bitmap for block allocation. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. In one embodiment, at block 401, the processing logic of process 400 can maintain tree representations for at least a portion of a bitmap indicating block allocation status in a storage system, such as storage 101 of FIG. 1. For example, each bit in the bitmap may indicate whether a corresponding one of the blocks represented by the bitmap is available or not.

Tree representations may include, for example, a location tree and an extent tree, such as location tree 111 and extent tree 113 of FIG. 1. Each tree representation may be a red-black tree with nodes corresponding to extents of available blocks in the storage system. The processing logic of process 400 can traverse the bitmap to build the tree representations whenever a portion of the bitmap is loaded in memory, e.g. when a system boots up. Optionally, the processing logic of process 400 can track which portions of a bitmap has been incorporated in each tree representation maintained, for example, based on indices of bits in the bitmap.

At block 403, the processing logic of process 400 may receive an allocation request to allocate an amount of space in a storage system for a file or other system components. In response, at block 405, the processing logic of process 400 may determine whether an allocation request is to create a new file, e.g. based on whether there are blocks already allocated for the file in a storage system. For an existing file, at block 407, the processing logic of process 400 can perform a red-black tree search in the location tree to identify a matching node based on the size of allocation space requested and/or locations of existing blocks allocated for the file.

A matching node may be perfect if the corresponding extent of available blocks has a capacity larger than the size of allocation space requested and located next to a block allocated for the file. In some embodiments, a search criteria for a matching node may locate an extent of available blocks close to (e.g. within a certain number of blocks) existing blocks allocated for the file. If a matching node is found, at block 409, the processing logic of process 400 may proceed to allocate storage space based on an extent of available blocks corresponding to a matching node at block 425. Otherwise, in one embodiment, at the processing logic of process 400 may proceed to search the extent tree for matching nodes at block 411.

In one embodiment, in response to an allocation request for a new file, the processing logic of process 400 may, at block 411, perform a red-black tree search in the extent tree to identify one or more matching nodes based on the size of allocation space requested. If more than one matching nodes are identified during the search, the processing logic of process 400 may select a best matching node (e.g. according to how closely the size of allocation space requested matches the space available in the extent corresponding to a matching node). In some embodiment, the processing logic of process 400 may select the first matched node during the tree search.

If matching nodes are found at block 413, the processing logic of process 400 may proceed to allocate identified blocks at block 425. Otherwise, at block 415, the processing logic of process 400 may determine if in memory tree representations incorporate all block allocation status in a bitmap. For example, the processing logic of process 400 can track which portion of the bitmap (e.g. via an index to bit locations in the bitmap) have been incorporated (or built) in the tree representations.

If the bitmap has not been completely built in the tree representations, at block 417, the processing logic of process 400 can traverse or search the bitmap directly to identify an extent of available blocks matching an allocation request. In one embodiment, the processing logic of process 400 may load a portion of the bitmap not yet covered in the tree representations to search for matching extents of available blocks. The portion of the bitmap may be loaded according to a size limitation of available memory space. In one embodiment, the processing logic of process 400 may search remaining portions of the bitmap, e.g. until a matching extent of available blocks is identified.

In the meanwhile when performing a search (e.g. a linear search bit by bit) directly in a bitmap, for example, at block 419, the processing logic of process 400 may continue building tree representations of the bitmap, such as a location tree and an extent tree, with loaded portions of the bitmap. If one or more matching extents of available blocks are found directly from the bitmap, the processing logic of process 400 may proceed to allocate blocks at 425.

If no matching node or extents of available blocks are found from tree representations of a bitmap and/or directly from the bitmap, at block 423, the processing logic of process 400 may identify one or more extents of available blocks satisfying an allocation request based on, for example, results of traversing tree representations (e.g. based on red-black tree search) of a bitmap and/or directly from the bitmap. The processing logic of process 400 may determine an optimal combination of available blocks to allocate for an allocation request considering, for example, minimizing fragmentation effects, maximizing storage usage, and/or fine tuning other file system performance parameters. Subsequently, the processing logic of process 400 may proceed to allocate identified available blocks at block 425. In one embodiment, at block 427, the processing logic of process 400 may update tree representations, such as a location tree and/or an extent tree, of a bitmap and the bitmap itself according to the allocation of identified blocks.

Figure 5:
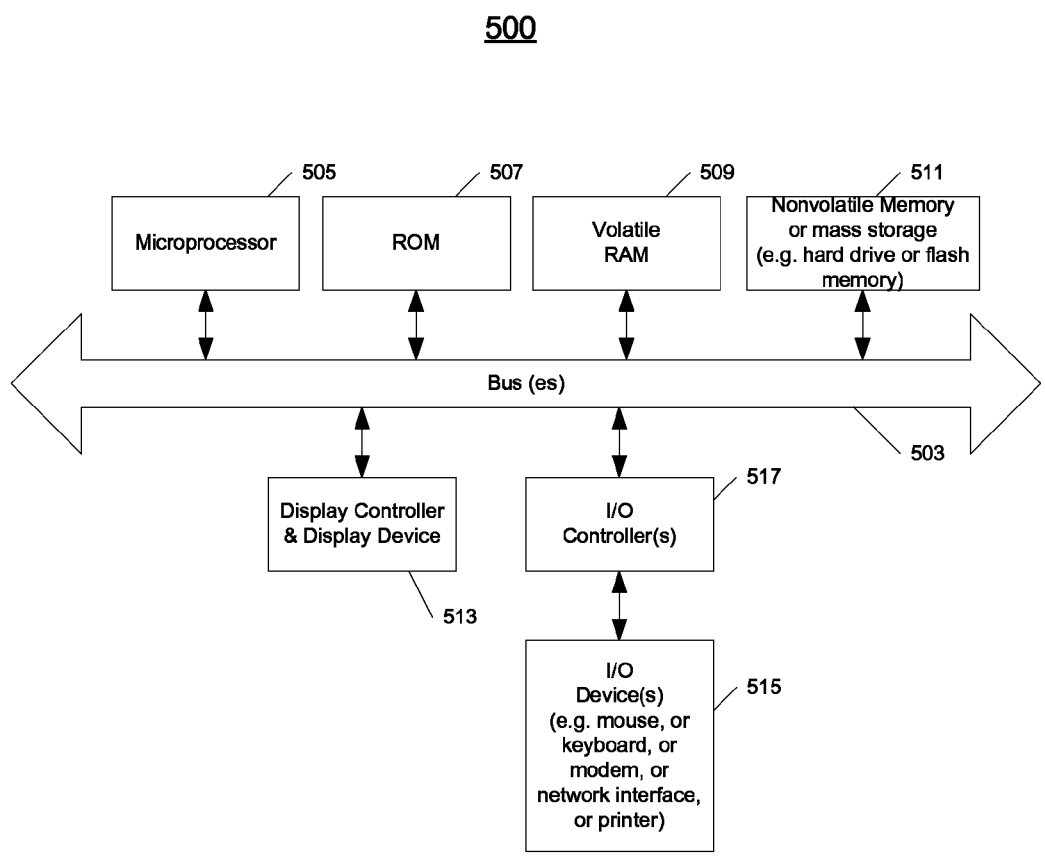
FIG. 5 illustrates one example of a data processing system such as a computer system, which may be used in conjunction with the embodiments described herein.

FIG. 5 shows one example of another data processing system such as a computer system, which may be used with one embodiment the present invention. For example, the system 500 may be implemented as a part of the system shown in FIG. 1. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (1/O) devices which may be mice, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g. large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method for implementing a file system, the method comprising:
   selecting, in response to a request to allocate space for a file within at least one storage device, one of a plurality of tree representations of a bitmap, wherein each bit in the bitmap indicates availability of a block in the at least one storage device;
   searching one or more nodes of the selected tree representation for a first node whose corresponding set of consecutive bits has a size that matches a number of blocks specified by the request;
   determining that the first node is not included in the one or more nodes of the selected tree representation;
   in response to determining, searching the one or more nodes of the selected tree representation for a second node whose corresponding set of consecutive bits has a size that is different from the number of blocks specified by the request, wherein the difference is within a predefined threshold;
   updating the bitmap to allocate the blocks that correspond to the second node; and
   synchronizing each tree in the plurality of trees with the updated bitmap.

2. The method of claim 1, wherein the at least one storage device is a mass storage device storing files for the file system.

3. The method of claim 1, wherein the second node includes a location of the corresponding set of consecutive bits in the bitmap and a size indicating a number of bits in the corresponding set of consecutive bits.

4. The method of claim 3, wherein selecting one of the plurality of tree representations based on the request comprises determining if the file is new in the file system.

5. The method of claim 4, wherein the selected tree representation is a location tree when the file is not new within the file system, and each of the one or more nodes included in the location tree is keyed according to a starting location of a first bit in the corresponding set of consecutive bits.

6. The method of claim 4, wherein the selected tree representation is an extent tree when the file is new within the file system, and each of the one or more nodes included in the location tree is keyed according to the size of the corresponding set of consecutive bits.

7. A non-transitory machine-readable storage medium having instructions, when executed by a machine, cause the machine to perform a method for implementing a file system, the method comprising:
   selecting, based on a request that specifies a number of blocks to allocate in at least one storage device for a file, one of a plurality of tree representations of a bitmap, wherein:
      each bit in the bitmap indicates availability of a different block in the at least one storage device, and
      each tree representation includes one or more nodes that each corresponds to a different set of consecutive bits in the bitmap;
   searching the one or more nodes of the selected tree representation for a first node whose corresponding set of consecutive bits has a size that matches the number of blocks specified by the request;
   determining that the first node is not included in the one or more nodes of the selected tree representation;
   in response to determining, searching the one or more nodes of the selected tree representation for a second node whose corresponding set of consecutive bits has a size that is different from the number of blocks specified by the request, wherein the difference is within a predefined threshold;
   determining that the second node is included in the one or more nodes of the selected tree representation;
   updating the bitmap to allocate the blocks that correspond to the second node; and
   synchronizing each tree in the plurality of trees with the updated bitmap.

8. An apparatus, comprising:
   a memory storing executable instructions including a file system;
   a storage device having blocks for storing data, the storage storing a bitmap, each bit in the bitmap indicating availability of a different one of the blocks;
   a processor coupled to the storage and the memory to execute the executable instructions from the memory for the file system, the processor being configured to:
      maintain a plurality of tree representations for the bitmap, wherein each tree representation includes one or more nodes, and each node in the tree representation corresponds to an extent of available blocks;
      select, in response to a request to allocate space within the storage device, one of the plurality of tree representations of the bitmap;
      search one or more nodes of the selected tree representation for a first node whose corresponding set of consecutive bits has a size that matches a number of blocks specified by the request;
      determine that the first node is not included in the one or more nodes of the selected tree representation;
      in response to the determination, search the one or more nodes of the selected tree representation for a second node whose corresponding set of consecutive bits has a size that is different from the number of blocks specified by the request, wherein the difference is within a predefined threshold;
      update the bitmap to allocate the blocks that correspond to the second node; and
      synchrone each tree in the plurality of trees with the updated bitmap.

9. The non-transitory machine-readable storage medium of claim 7, wherein the plurality of tree representations are maintained in memory if the file system is mounted.

10. The non-transitory machine-readable storage medium of claim 7, wherein the second node includes a location of the corresponding set of consecutive bits in the bitmap and a size indicating a number of bits in the corresponding set of consecutive bits.

11. The non-transitory machine-readable storage medium of claim 10, wherein selecting one of the plurality of tree representations based on the request comprises determining if the file is new in the file system.

12. The non-transitory machine-readable storage medium of claim 11, wherein the selected tree representation is a location tree when the file is not new within the file system, and each of the one or more nodes included in the location tree is keyed according to a starting location of a first bit in the corresponding set of consecutive bits.

13. The non-transitory machine-readable storage medium of claim 11, wherein the selected tree representation is an extent tree when the file is new within the file system, and each of the one or more nodes included in the location tree is keyed according to the size of the corresponding set of consecutive bits.

14. The system of claim 8, wherein the second node includes a location of the corresponding set of consecutive bits in the bitmap and a size indicating a number of bits in the corresponding set of consecutive bits.

15. The system of claim 14, wherein selecting one of the plurality of tree representations based on the request comprises determining if the file is new in the file system.

16. The system of claim 15, wherein the selected tree representation is a location tree when the file is not new within the file system, and each of the one or more nodes included in the location tree is keyed according to a starting location of a first bit in the corresponding set of consecutive bits.

17. The system of claim 15, wherein the selected tree representation is an extent tree when the file is new within the file system, and each of the one or more nodes included in the location tree is keyed according to the size of the corresponding set of consecutive bits.

* * * * *